United States Patent [19]
Stockwell

[11] 3,957,351
[45] May 18, 1976

[54] BACKLIGHTED DISPLAY APPARATUS
[75] Inventor: Glade M. Stockwell, Cedar Rapids, Iowa
[73] Assignee: Rockwell International Corporation, El Segundo, Calif.
[22] Filed: Sept. 16, 1974
[21] Appl. No.: 506,378

[52] U.S. Cl. ............... 350/160 LC; 40/130 R; 240/2 AT; 350/276 R
[51] Int. Cl.² ............................................ G02F 1/13
[58] Field of Search ............ 350/160 LC; 40/106.1, 40/130 R; 240/2 AT, 2.1

[56] References Cited
UNITED STATES PATENTS

| | | | |
|---|---|---|---|
| 3,653,138 | 4/1972 | Cooper | 350/160 LC X |
| 3,674,341 | 7/1972 | Hedman, Jr. et al. | 350/160 LC |
| 3,748,018 | 7/1973 | Borden, Jr. | 350/160 LC |
| 3,838,909 | 10/1974 | Fitzgibbons | 350/160 LC |
| 3,863,246 | 1/1975 | Trcka et al. | 40/130 K X |

Primary Examiner—John K. Corbin
Assistant Examiner—Matthew W. Koren
Attorney, Agent, or Firm—Terry M. Blackwood; Robert J. Crawford

[57] ABSTRACT

A backlighted display apparatus including a light source, and a display means having both transparent areas and light diffusing areas. Located therebetween is light refractive means for concentrating and controlling light illuminating the display means. Light absorptive means are appropriately disposed to provide contrast.

5 Claims, 13 Drawing Figures

BACKLIGHTED DISPLAY APPARATUS

BACKGROUND OF THE INVENTION

The present invention is related to display apparatus and more particularly to display apparatus in which a display device, including transparent areas and areas capable of light diffusion, is illuminated from the back.

Generally, in such display apparatus as above mentioned, the light diffusable areas represent indicia to be displayed and the transparent areas represent the indicia-defining background. For such backlighted displays to be at all effective, an observer should receive light from the light diffusing areas, and simultaneously, to preserve contrast, should receive light of lesser intensity, or of different color, from the transparent areas.

One approach to providing this result is shown in U.S. Pat. No. 3,674,341, Hedman et al. Black or colored surfaces are disposed directly behind the display material and light from a source is directed obliquely onto the display material either by light baffles or light baffles in combination with mirrored surfaces. Some of the light striking the diffusing areas is redirected by forward scattering toward an observer in front of the display while light striking the transparent areas escapes from the device substantially unaltered.

Such an approach produces problems in some environments such as airplane cockpits. The primary disadvantage is attributable to light which escapes through the transparent areas of the device. Such direct transmission of source light into the cockpit is especially detrimental to the night vision of the aircraft operators. Other problems reside in the inefficient use of the light energy, which in an aircraft cockpit would result in inefficient use of aircraft electrical power and also would result in additional heat undesirably generated in the cockpit.

Another approach is set forth in U.S. patent application Ser. No. 377,487 assigned to the assignee of the present invention. (Said application issued as U.S. Pat. No. 3,863,246 on Jan. 28, 1975.) Therein, a prism is employed between the light source and the display. Louvered material is attached to the back of the prism for providing contrast and for controlling the direction of light rays impinging on the front display surface. In some embodiments, the light is prevented from striking the display surface at angles less than the critical angle of incidence. Thus, all undiffused light is internally reflected.

However, it is difficult to consistently achieve proper bonding between the prism and the louvered material. In addition, since louvers columnize light rays by eliminating or blocking out those rays which are not propagating in the desired direction, louvers are a fairly inefficient means of controlling light ray direction.

Therefore, it is an object of this invention to provide an improved backlighted display apparatus. It is a more specific object of this invention to provide a backlighted display apparatus with good contrast, which prevents blinding of an observer, and which overcomes the problems associated with baffle or louver light-control schemes.

These and further objects, features, and advantages of the invention will become more apparent upon reference to the following specification, claims, and appended drawings wherein:

Figure 1:
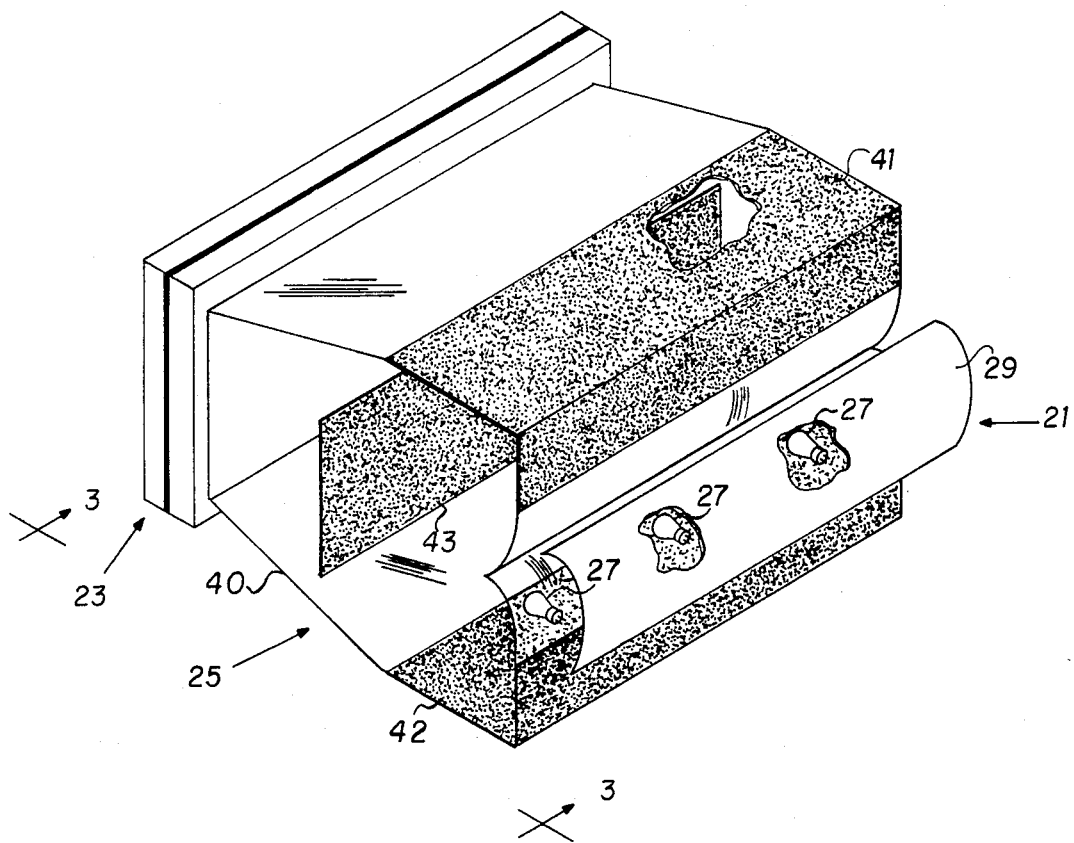
FIG. 1 is a perspective view, partially cut away, of the presently preferred embodiment of this invention.
Figure 3:
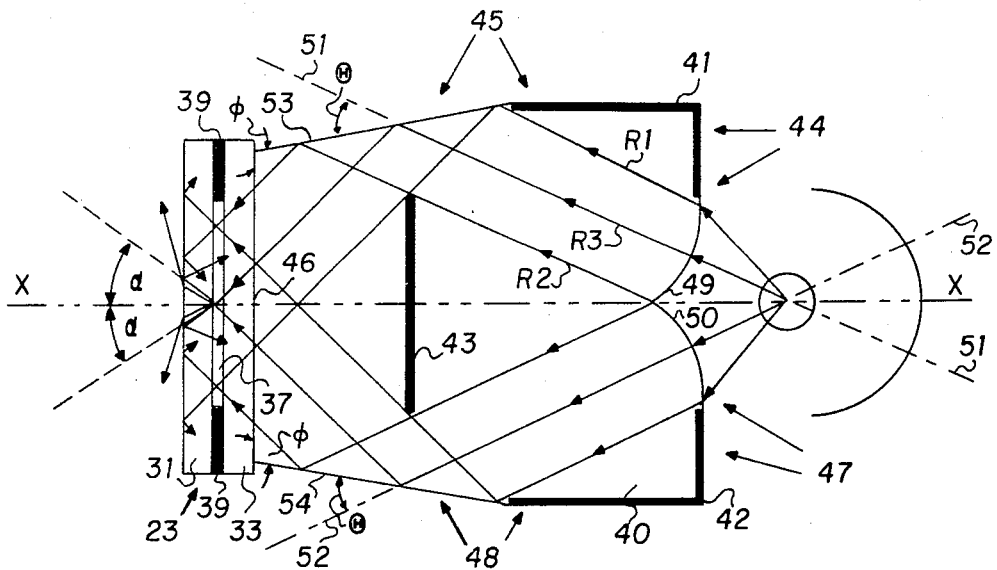
Figure 4:
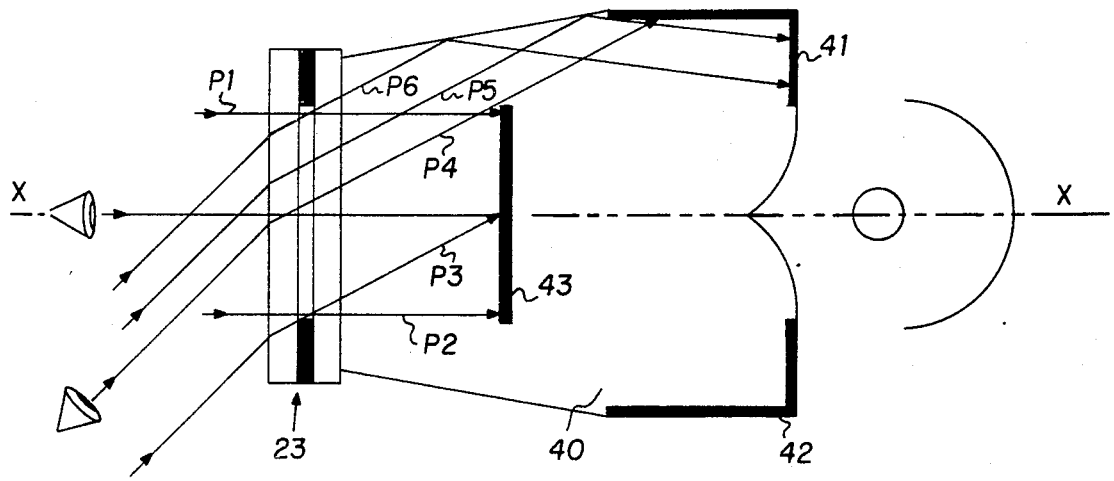
Figure 5:
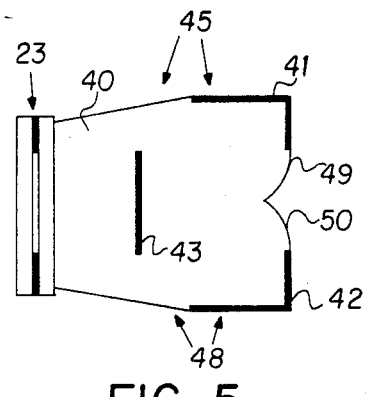

FIGS. 3, 4, and 5 are somewhat schematic side views taken along line 3—3 of FIG. 1; and FIGS. 6 through 13 parallel the FIG. 5 manner of illustration and are somewhat schematic side views of exemplary alternative embodiments.

DESCRIPTION OF THE PREFERRED EMBODIMENT

A display apparatus incorporating the principles of the present invention, and in addition representing the presently preferred embodiment is shown in FIG. 1. The FIG. 1 embodiment includes a light source 21, a liquid crystal display device 23 and, positioned between these two components, a light-controlling, contrast-providing device 25. Merely to preface additional details set forth hereinbelow, light from source 21 is channeled by device 25 and guided to liquid crystal display 23 which operates on the light to manifest indicia; moreover optical paths from the front of the display apparatus are appropriately routed by the device 25 to provide contrast.

More specifically, light source 21 simulates a line source of light and comprises a row of lamps 27 backed by reflector 29. A liquid crystal cell employed in the transmissive mode, and of a type well-known in the art, constitutes the liquid crystal display device 23 which is illustrated in more detail in FIG. 2. Since such liquid-crystal devices and the associated phenomenon are detailed in the art (see U.S. Pat. Nos. 3,499,702, 3,674,341 and 3,499,112) only a brief description, appropriate for purposes of describing the present invention, and dealing with construction and operation, is presented below.

Figure 2:
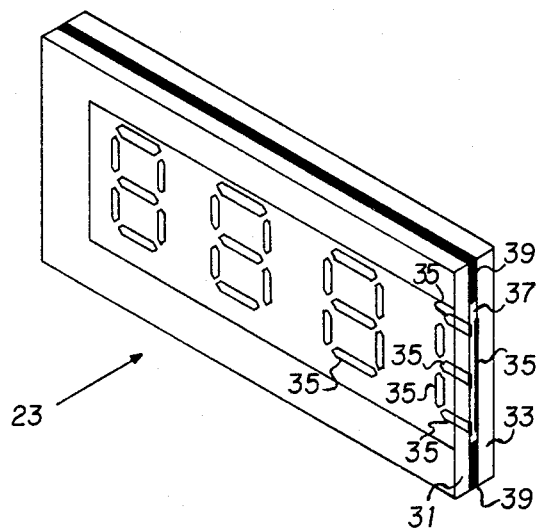
FIG. 2 is a perspective view in section of a liquid crystal display device.

Referring, then, briefly to FIG. 2, front and rear glass plates 31 and 33 have on their inner surfaces transparent electrodes 35 that energize the liquid crystal fluid 37 retained between the plates by spacer seal 39. The distance between the plates is greatly exaggerated for clarity. In the preferred embodiment, nematic liquid crystal material is employed. The transparent electrodes 35 comprise transparent conductive material deposited on the glass surfaces. On one of the glass surfaces it is deposited in the pattern to be displayed, most generally in a segment pattern, with conductive leads brought to terminations. Generally the other electrode located opposingly across the fluid is nonpatterned, covers the total area of the segment pattern, and has a single lead brought to termination. The border around the perimeter of the crystal formed by spacer seal 39 is opaque. The area inside the border is transparent when the crystal is not energized. When the electrodes forming a display character are energized, the liquid crystal fluid between the front and back electrodes diffuses light and therefore appears chalky or translucent. The shape and size of the area of translucency is the same as the energized character forming electrode. When the area is viewed by transmitted backlighting, it is a translucent white. Although their roles may occasionally be reversed as to which areas form the characters and which areas form the background, in any event the light diffusing areas together with the transparent areas define the indicia to be displayed.

As will be realized, the display device may comprise any material containing both areas capable of light diffusion and transparent areas. For instance, a frosted pattern on a transparent plate of acrylic plastic material, or some type of a negative.

As seen most clearly by reference to FIGS. 1 and 3 jointly, the light-controlling, contrast-providing device 25 comprises an appropriate configuration of transparent, light refractive material, herein referred to as a prism-like device 40, and three light absorptive members 41, 42 and 43 which are preferably black and opaque. The prism-like device has index of refraction similar to glass. It is substantially symmetrical about a reference plane X—X, and includes five surfaces 44, 45, 46, 47 and 48. At least a part of source-adjacent surfaces 44 and 47 are configured as converging lenses 49 and 50. Lens' axes 51 and 52 intersect substantially planar regions 53 and 54 of surfaces 45 and 48, forming therewith an angle O. Surface 46 is substantially planar and forms an angle $\phi$ with each of planar regions 53 and 54. Surface 46 also receives liquid crystal display device 23 by optical bonding thereto.

Absorbing members 41 and 42 are disposed along the device exterior between the converging lens surfaces 49 and 50 and the planar regions 53 and 54. Absorptive member 43 is disposed within the prism-like device, between the source-adjacent surfaces and the display receiving surface 46. Absorptive member 43 is remote from each of members 41 and 42 so as to form a pair of optical passageways through which the lens' axes are directed. Furthermore, the absorptive members are disposed to prevent any direct, unrefracted, rays from reaching the liquid crystal portion of the display device.

As seen from FIG. 3, in operation, the converging lens surfaces 49 and 50 concentrate, by reducing light ray divergence, light from the source into beams directed through the optical passageways toward the planar regions 53 and 54 of surfaces 45 and 48. The angle of intersection 0 is constrained according to $0° < \theta \leq (90° - \alpha)$, where $\alpha$ = critical angle of incidence for the particular material employed in the prism-like device so that total internal reflection occurs at regions 53 and 54. Both light beams then propagate on toward display receiving surface 46. Since the prism-like device 40 and the rear retaining plate 33 have similar indices of refraction and are optically bonded together, light passes on through this interface substantially unrefracted to the plane of the liquid crystal material itself. Rays such as R1 and R2 which intersect unactivated, transparent portions of the liquid crystal pass substantially unaffected onto the front surface of the retaining plate 31 where, since the actual angle of incidence is controlled with respect to the critical angle of incidence, they are totally internally reflected. This control over the angle of incidence is achieved for the embodiment shown by constraining $\phi$ as follows:

$(90° - \theta + \alpha) \leq \phi < 180°$

The most effective illumination of the activated segments occurs when $\phi$ approaches the value $(90° - \theta + \alpha)$.

Rays such as R3 which strike activated segments of the liquid crystal are diffused and forward scattered toward the front surface of plate 31. Forward scattered rays which impinge on the front surface at angles less than the critical angle of incidence $\alpha$ are refracted at the interface and emerge therefrom into a field of observation, thus making the diffusing segments viewable within this field. Since the critical angle of incidence $\alpha$ determines the range over which rays may escape, the field of observation (i.e., the field from which "on" segments may be viewed) theoretically comprises for the FIG. 3 embodiment very nearly a full 180° field located at the left of the front surface. This is because for angles approaching the critical angle of incidence the rays are bent almost parallel to the front surface. Thus the field of observation theoretically comprises very nearly ± 90° about the reference plane X—X. It should also be noted that due to loss of resolution and/or brightness at the severely large angles, the angular range over which on segments actually provide legible indicia to an observer approaches the theoretical 180° but is, as a practical matter, slightly less than 180°.

FIG. 4 illustrates how, in the preferred embodiment, transparent areas are caused to appear in contrast to the light diffusing segments. Briefly, it is seen that optical paths from substantially anywhere within the field of observation, and passing through transparent areas of the liquid crystal, are eventually routed to, and terminated at, at least one of the light absorptive members 41, 42 or 43. More particularly, at zero or small viewing angles with respect to the reference plane X—X, optical paths are routed directly to at least one of the absorptive members 41, 42 or 43. (See ray paths P1 and P2.) At larger viewing angles, with respect to the reference plane X—X, the optical paths are either routed directly to member 43 (as is ray path P3), directly to members 41 or 42 (as is ray path P4), or indirectly by reflection from a planar region 53 or 54 to members 41 or 42 (as are ray paths P5 and P6). Thus the transparent areas appear dark and in substantial contrast to the light diffusing segments. As will be shown later, the absorptive members may be configured other than as shown to achieve the same results.

A transparent acrylic plastic material (e.g., Plexiglas brand or Lucite brand acrylic material) is presently the preferred material from which to make the prism-like device 40. Also presently preferred is to construct the prism-like device from two portions (not separately shown in the figures) which mate at the plane containing absorptive member 43. Prior to joining these two portions, a shallow cavity (about 0.005 inches) is created by machining or molding in the mating face of the left portion. A thin coat, approximately 0.005 inches thick, of black epoxy paint is then deposited (by spray painting) in this cavity to form light absorbing member 43. Also in the preferred embodiment, light absorbing members 41 and 42 comprise thin coats of black epoxy paint deposited on the appropriate parts of the exterior by spray painting.

The left and right portions are optically bonded together by attaching the appropriate surfaces with an optically clear adhesive having an index of refraction substantially the same as glass or the transparent acrylic plastic material. Optical bonding between the prism-like device 40 and the rear retaining plate 33 of display 23 is achieved in a like manner.

The left and right portions may be molded or machined from blocks of material and then polished. The latter method is presently preferred. Although in the presently preferred embodiment, surface 46 should be reasonably flat to properly mate with retaining plate 33, it should be apparent that surfaces 44, 45, 47 and 48 need not be manufactured to any great degree of precision. It is only considered essential to increase light concentration, (i.e., increase light flux density), as do the lens portions 49 and 50, and then to provide controlled reflection, as from surfaces 45 and 48, on toward the display such that light arrives thereat at angles exceeding the critical angle of incidence. For instance, regions 53 and 54, described heretofore as planar, could be somewhat curved, and lens portions 49 and 50 could be more nearly planar than, as heretofore shown, convex.

FIGS. 6 through 13 show further exemplary alternatives falling within the scope of the present invention. FIG. 5 represents again the presently preferred embodiment and is included with FIGS. 6 through 12 as a basis for comparison. As seen from FIG. 6, absorptive members 41 and 42 may be replaced, on an appropriately configured prism-like device, with absorptive members 41a and 42a, each of which lies along a straight line joining the extremes of an original member 41 or 42.

Figure 7:
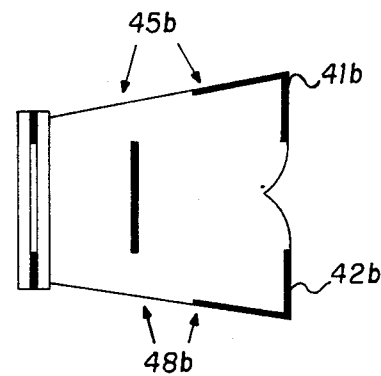

FIG. 7 shows the prism with five distinct surfaces where the entirety of surfaces 45b and 48b are altogether planar. Light absorptive members 41b and 42b still extend between the same extremes as members 41 and 42 in FIG. 5.

Figure 8:
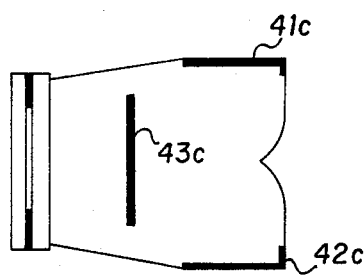

FIG. 8 shows one way in which the light absorptive members may be varied in combination. With respect to their FIG. 5 analogies, the length of members 43c is increased and the vertical component of members 41c and 42c is decreased, but as in the preferred embodiment, contrast is provided from substantially everywhere within the field of observation.

Figure 9:
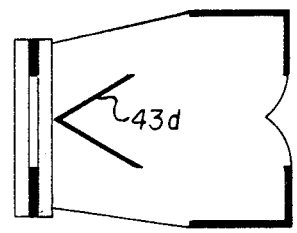
Figure 6:
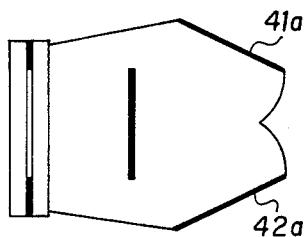
Figure 10:
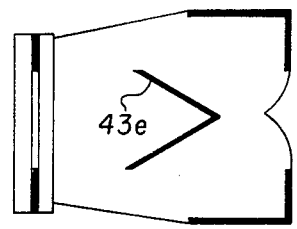

FIGS. 9 and 10 show two ways in which member 43 may be varied from the preferred FIG. 5 embodiment. It should be apparent that members 43d and 43e perform substantially the same as member 43.

Figure 11:
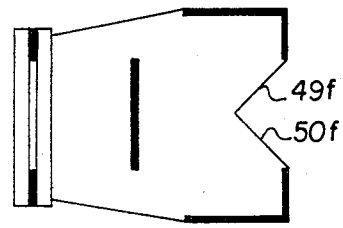

FIG. 11 shows that, as earlier mentioned, the converging lens surfaces are not overly critical. Even the relatively planar surfaces 49f and 50f of FIG. 11 have a concentrating effect on light rays by reducing divergence thereof.

Figure 12:
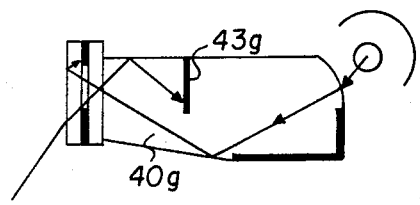
Figure 13:
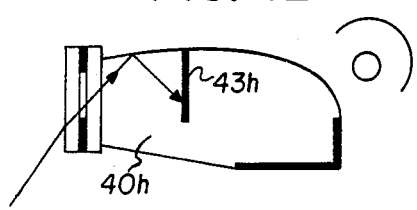

FIGS. 12 and 13 are intended to show that this invention may be practiced with basically only half of the preferred embodiment. That is, only three nonparallel surfaces and two light-absorptive members, properly configured and disposed, are essential. Device contours which do not interfere with the optical ray path guiding of the three nonparallel surfaces and the two light-absorptive members are relatively unimportant. For instance, note the FIG. 13 alternative to the FIG. 12 embodiment.

It should also be noted that for embodiments analogous to those of FIGS. 12 and 13, contrast is provided over an angle at least half that of the preferred embodiment. Also, contrast over an angular range equivalent to that of the preferred embodiment is readily accomplishable. More particularly, and referring to FIGS. 12 and 13 proper termination of optical ray paths originating from the larger negative angles can be provided by an extended application of the teachings herein. One way of so providing, not shown in FIGS. 12 and 13, is to extend absorptive members 43g and 43h forward along the device upper boundary toward the display. Thus the absorptive members become configured as inverted L shapes. Alternatively, and as shown in FIGS. 12 and 13, internal reflection of these paths toward existing absorptive members will assure contrast over an angular range equivalent to that of the preferred embodiment. Appropriate internal reflection may be achieved by configuring the device upper boundary so that all these paths originating from large negative angles impinge on the boundary at angles exceeding the critical angle of incidence. For device materials having indices of refraction similar to glass or acrylic material, an upper boundary orthogonal to the front surfaces (FIG. 12) or appropriately sloped with respect to the front surface (one example is shown in FIG. 13) will accomplish the desired results.

A further modification of the preferred embodiment, but not illustrated, may comprise a circularly symmetrical display apparatus appropriate for illuminating a circular dial or the like. It should also be apparent that although the preferred embodiment is described as substantially symmetrical about a reference plane, physical or structural symmetry is not an essential feature. It should also be apparent that the absorptive members need not be black. For some applications red, blue, or green, for instance, may be more appropriate. Moreover, other members of various types and colors may be employed so long as they block the direct, unrefracted rays from the source toward the display, and also provide contrast to the on segments.

Thus while particular embodiments of the present invention have been shown and described, it is apparent that changes and modifications may be made therein without departing from the invention in its broader aspects. The aim of the appended claims, therefore, is to cover all such changes and modifications as fall within the true spirit and scope of the invention.

What is claimed is:

1. A backlighted display apparatus having a predetermined field of observation from which indicia are viewable, said apparatus comprising: light source means; display means having at least one segment capable of light diffusion and transparent areas; and means between said light source means and said display means for controlling the angle of incidence of rays impinging on said display surface and for causing said transparent areas to appear in contrast to the light diffusing segments, said light-controlling, contrast-providing means comprising: a prism-like, light refracting device having at least first, second, and third nonparallel surfaces, and a pair of light absorptive members cooperating with said prism-like device and disposed to produce a light passageway in the prism-like device, said first surface disposed near said light source means and at least partially geometrically configured as a converging lens for producing a concentrated beam of light directed toward said third surface through said passageway formed by said pair of light absorptive members, said third surface configured and disposed to reflect said light beam on toward said second surface, said second surface being optically bonded to said display means, said display means being disposed such that substantially all light arriving thereat from said third surface arrives at an angle greater than the critical angle of incidence, at least one of said absorptive members being disposed to intercept rays propagating from said source directly toward said display means, and said absorptive members being further disposed such that lines of sight originating from a substantial portion of said field of observation are routed to at least one of said absorptive members.

2. A backlighted display apparatus having a predetermined field of observation from which indicia are viewable, said apparatus comprising: light source means; display means having at least one segment capable of light diffusion and transparent areas; and means between said light source means and said display means for controlling the angle of incidence of rays impinging on said display surface and for causing said transparent areas to appear in contrast to the light diffusing segments, said light-controlling, contrast-providing means comprising a prism-like, light refracting device having at least first, second, third, fourth and fifth surfaces, and first, second, and third light absorptive members cooperating with said prism-like device and disposed to produce first and second light passageways in the prism-like device, said first and fourth surfaces disposed near said light source means and respectively geometrically configured, at least partially, as first and second converging lenses for producing respectively first and second concentrated beams of light directed respectively toward said third and fifth surfaces through respectively said first and second passageways formed by said three light-absorptive members, said third and fifth surfaces configured and disposed to reflect respectively said first and second light beams on toward said second surface, said second surface being optically bonded to said display means, said display means being disposed such that substantially all light arriving thereat from said third and fifth surfaces arrives at an angle greater than the critical angle of incidence, at least one of said absorptive members being disposed to intercept rays propagating from said source directly toward said display means, and said absorptive members being further disposed such that substantially all lines of sight originating from said field of observation are routed to at least one of said absorptive members.

3. Display apparatus as defined in claim 2 wherein said light-controlling, contrast-providing means is substantially symmetrical about a reference plane such that said first surface, said third surface, and said first passageway are substantially the same as mirror images respectively of said fourth surface, said fifth surface, and said second passageway.

4. Display apparatus as defined in claim 2 wherein said display means is a nematic liquid crystal display device which includes transparent retaining means, nematic liquid crystal material inside said retaining means, and transparent electrode means arranged in an appropriate pattern for defining the indicia to be displayed, said electrode means causing, when energized, predetermined portions of the liquid crystal material to become said light diffusing segments.

5. For use in a backlighted display apparatus between light source means and display means having both transparent areas and light diffusable areas, illumination control means comprising a prism-like, light refractive device having at least a first surface for receiving light directly from said source, a second surface for receiving said display means, and a third surface for interconnecting said first and second surfaces, said first surface being at least partially configured as a converging lens with the lens axis intersecting said third surface, said third surface being substantially planar in the region around said lens axis intersection and disposed such that the angle $\theta$ between said lens axis and said third surface is greater than zero degrees and is no greater than $(90° - \alpha)$ where $\alpha$ is the critical angle of incidence, said second surface being substantially planar and disposed such that the angle $\phi$ between said third surface and said second surface is less than 180° and is no less than $(90° - \theta + \alpha)$, said illumination control means further including at least first and second light absorptive members, said first absorptive member being disposed along the prism-like device exterior from said converging lens to a location on said third surface short of said region of lens axis intersection, said second absorptive member disposed within said prism-like device between said first and second surfaces, said second member being remote from said first member and forming therewith an optical passageway.

* * * * *

UNITED STATES PATENT OFFICE
CERTIFICATE OF CORRECTION

PATENT NO. : 3,957,351
DATED : May 18, 1976
INVENTOR(S) : Glade M. Stockwell

It is certified that error appears in the above-identified patent and that said Letters Patent are hereby corrected as shown below:

IN THE SPECIFICATION:

Column 3, Line 19, after the word "angle", delete "0" and substitute therefor --$\theta$--.
Column 3, Line 39, after the word "intersection", delete "0" and substitute therefor --$\theta$--.
Column 4, Line 15, add quotation marks around the word "on".
Column 6, Line 24, add quotation marks around the word "on".

Signed and Sealed this

Twenty-seventh Day of July 1976

[SEAL]

Attest:

RUTH C. MASON
Attesting Officer

C. MARSHALL DANN
Commissioner of Patents and Trademarks